US007983868B2

(12) United States Patent     (10) Patent No.: US 7,983,868 B2
Doytchinov     (45) Date of Patent: Jul. 19, 2011

(54) FITTING MEASURED DATA POINTS TO TOLERANCE ZONES HAVING REGARD FOR THE UNCERTAINTY OF THE MEASUREMENTS

(75) Inventor: Kostadin Doytchinov, Ottawa (CA)

(73) Assignee: Quality Vision International, Inc., Rochester, NY (US)

( * ) Notice: Subject to any disclaimer, the term of this patent is extended or adjusted under 35 U.S.C. 154(b) by 474 days.

(21) Appl. No.: 12/139,127

(22) Filed: Jun. 13, 2008

(65) Prior Publication Data

US 2008/0249731 A1    Oct. 9, 2008

Related U.S. Application Data

(62) Division of application No. 11/421,643, filed on Jun. 1, 2006, now Pat. No. 7,400,992.

(51) Int. Cl.
    *G06F 19/00* (2006.01)
    *G06F 17/40* (2006.01)

(52) U.S. Cl. ............. 702/95; 702/94; 702/155; 700/175

(58) Field of Classification Search ................... 702/95, 702/94, 97, 150, 155
See application file for complete search history.

(56) References Cited

U.S. PATENT DOCUMENTS

| | | | |
|---|---|---|---|
| 5,208,763 A | 5/1993 | Hong et al. | |
| 6,178,389 B1 * | 1/2001 | Sola et al. | 702/152 |
| 6,665,080 B1 | 12/2003 | Haertig et al. | |
| 7,660,697 B2 * | 2/2010 | Hamazoe | 702/155 |
| 2003/0001835 A1 | 1/2003 | Dimsdale et al. | |
| 2003/0236645 A1 | 12/2003 | Santic | |
| 2005/0165578 A1 | 7/2005 | Gorsch et al. | |
| 2006/0047457 A1 * | 3/2006 | Agapiou et al. | 702/94 |
| 2006/0067579 A1 | 3/2006 | Pirkl et al. | |

FOREIGN PATENT DOCUMENTS

GB    2230363 A    10/1990

OTHER PUBLICATIONS

Dr. Henrik S. Nielsen, "Specifications, operators and uncertainties", HN Metrology Consulting, Inc., Abstract: ISO/TS17450-2:2002, 2002, 5 pages.
Cameron Miller and Yoshi Ohno, "Living with Uncertainty, Understanding and Quantifying Uncertainty is Key to Accurate and Cost-Effective Testing", Special focus Tutorial, Feb. 2005, SPIE's oemagazine, pp. 19-21.
Katrina C. Arabe, "Measuring with Certainty-and Uncertainty: Industrial Market Trends", ThomasNet.com/IMT/archives/print/2002/11/measuring_with_.html, Jan. 15, 2006.
International Search Report and Written Opinion for international Application No. PCT/US2007/069629, Feb. 5, 2008.
Modayur, Bharath R., "A CAD-Based System for Automated inspection of Machines Parts", IROS '92, vol. 2, Proceedings of the 1992 IEEE/RSJ International Conference on intelligent Robots and Systems, Raleigh, NC, Jul. 7-10, 1992, pp. 1231-1238, Published Jul. 7, 1992.

* cited by examiner

*Primary Examiner* — Hal D Wachsman
(74) *Attorney, Agent, or Firm* — Stephen B. Salai, Esq.; Thomas B. Ryan; Harter Secrest & Emery LLP

(57) ABSTRACT

Measurement data collected within a measurement frame of reference is fitted to geometric tolerance zones having regard for the uncertainties of the measurement. Geometric freedoms for fitting the measurement data are exploited to fit uncertainty zones associated with the measurement data within the tolerance zones. Typically, the measurement data is multidimensional and the uncertainty zones have different sizes.

18 Claims, 6 Drawing Sheets

US 7,983,868 B2

FITTING MEASURED DATA POINTS TO TOLERANCE ZONES HAVING REGARD FOR THE UNCERTAINTY OF THE MEASUREMENTS

RELATED APPLICATIONS

This application is a divisional of nonprovisional U.S. patent application Ser. No. 11/421,643, filed on Jun. 1, 2006 and now issued as U.S. Pat. No. 7,400,992, which is hereby incorporated by reference.

BACKGROUND OF THE INVENTION

1. Field of the Invention

The invention relates multidimensional measurement data evaluations with respect to geometrical tolerances, particularly by using best-fitting type algorithms and accounting for uncertainties of measurement.

2. Description of Related Art

Measurement data concerning the geometric dimensions of test parts can be acquired by using many different types of measuring instruments, including both contacting and non-contacting forms of measurement. Multiple data points associated with individual test parts are generally related to each other through a common datum of the measuring instrument.

Metrology programs for accepting or rejecting manufactured test parts compare the measured data points of the test parts to an ideal or nominal definition (also referred to as a nominal model boundary) of the test parts straddled by geometric tolerance zones that specify how much the measured data points can deviate from the ideal part definition and still be accepted. Best-fitting algorithms collectively fit the measured data points of the test parts to the ideal definition of the test parts. In making the best collective fit for the measured data points, the common frame of reference of the measured data points is adjusted with respect to the frame of reference of the ideal part definition.

Many best-fitting algorithms find the orientation of the measured data points with respect to the ideal part definition at which the measured data points collectively deviate from the ideal part definition by a least amount. This can be a good solution if the tolerances for all the part dimensions are equally balanced about the ideal part definition. However, such best-fitting algorithms that converge toward the ideal part definition can reject test parts, as having one or more measured data points out of tolerance, that might otherwise be fit within the tolerances.

A non-linear optimization approach proposed in U.S. Pat. No. 6,665,080 to Haertig et al. is carried out on a point-by-point basis to best fit all of the data points within the geometric tolerances. In other words, all of the data points are fit within the tolerance boundaries (i.e., within a tolerance zone) as best as possible without particular regard for the ideal definition of the part.

The reliability of the measured data points to represent actual dimensions of a test part also affects the reliability of the determinations as to whether measured test parts are actually within the tolerance zone. Measurement errors can lead to erroneous conclusions that some measured test parts are within the tolerance zone when they are not and other measured parts are not within the tolerance zone when they are. To reduce such errors, measurement uncertainties have been quantified, which allows for statistically better test part evaluations to be made.

The uncertainties of the test part measurements depend on a number of factors such as the accuracy of the measuring instruments, environmental conditions during the measurements, the properties of artifacts, the knowledge of meteorologists, and measurement techniques. The uncertainties can vary for each point of measurement. Standards have been developed to estimate the uncertainties and to apply the uncertainties to the acceptance or rejection of test parts against known tolerances.

Applying the estimated uncertainties to the fitted data allows more statistically accurate measurement results. Based on Gaussian error estimates, each measured point can be associated with an uncertainty range corresponding to a particular confidence interval. For example, the uncertainty range of a measured point can be set to correspond to a confidence interval of 95 percent covering a range of values within two standard deviations of the measured value. A so-called acceptance zone can be defined by contracting the tolerance zone boundaries on either side of the ideal part definition through a guard band corresponding to one-half of the uncertainty range. Measured points found within the acceptance zone have at least a 95 percent chance of actually being within the tolerance zone. Test parts in which all measured points fit within the acceptance zone are generally accepted as being within tolerance.

Uncertainty zones straddle the tolerance boundaries by one-half of the uncertainty range on each side. Measured points within the uncertainty zone cannot be determined to be either inside or outside the tolerance zone with the desired level of confidence. Test parts having measured points within the uncertainty zone are generally not accepted as being within tolerance. Test parts having measured points beyond the uncertainty zone are rejected as being out of tolerance.

Often the results of best fitting techniques and subsequent uncertainty analyses of measured data points are used to make decisions about the acceptance, non-acceptance, or rejection of test parts as well as on corrective actions needed to accept the parts. The rejection or non-acceptance of test parts that might actually be within tolerance or the acceptance of parts that might actually not be within tolerance can have significant consequences.

BRIEF SUMMARY OF THE INVENTION

Actively incorporating the uncertainties of measurement for best fitting measured data points within tolerance zones can provide a more accurate basis for accepting, not-accepting, or rejecting parts. For example, local acceptance zones can be defined for each measured point by contracting the tolerance zones of the measured points by the uncertainty ranges of the measured points. Best-fitting algorithms can be used for finding solutions where all or as many as possible of the measured data points of a part fit within their local acceptance zones. Incorporating the uncertainties of the measurements into the search for collectively matching the measured points to their tolerance zones can result in the identifying more solutions for accepting parts and in increasing confidence that the measured parts are actually inside or outside the tolerance zones set for the parts.

One version of the invention as a method of treating multidimensional measurement data for comparing measured parts against tolerance zones includes acquiring a set of multidimensional data points corresponding to measured locations on a test part. Uncertainty ranges are associated with the multiple dimensions of the data points for defining uncertainty zones of different sizes surrounding the data points within a measurement frame of reference. The measurement frame of reference is moved with respect to an ideal frame of reference of the tolerance zones exercising at least two degrees of freedom to identify a best fit of the different size uncertainty zones of the measurement frame of reference within the tolerance zones of the ideal frame of reference. A determination is made as to whether the different size uncertainty zones of the measurement frame of reference collectively fit within the tolerance zones of the ideal frame of reference at the best fit of the relative orientations between the measurement and ideal frames of reference for accepting or not accepting the part.

Preferably, the relative motion of the measurement frame of reference includes collectively translating and rotating the different size uncertainty zones with respect to the tolerance zones of the ideal frame of reference. For example, the measurement frame of reference can be (a) relatively translated in two orthogonal directions with respect to the ideal frame of reference and (b) relatively rotated with respect to the ideal frame of reference about at least one orthogonal axis. For measuring parts in three dimensions, the measurement frame of reference can be translated with respect to the ideal frame of reference in three orthogonal directions and relatively translated with respect to the ideal frame of reference about three orthogonal axes.

The multidimensional data points preferably include values in at least two spatial dimensions. The uncertainty ranges for the spatial dimensions of the individual data points can vary between the data points. The same spatial dimensions of different points can also have different uncertainty ranges. The uncertainty ranges in more than one spatial dimension can be used to define uncertainty zones surrounding the individual data points. For example, equal uncertainty ranges in two dimensions can be used to define uncertainty zones having substantially circular areas. Unequal uncertainty ranges in two dimensions can be used to define uncertainty zones having substantially oblong areas. The invention is particularly adaptable to uncertainty zones that occupy radially asymmetric zones of space and can provide for determining if the asymmetric uncertainty zones of the measurement frame of reference fit within the tolerance zones of the ideal frame of reference at one of the relative orientations between the measurement and ideal frames of reference for accepting or not accepting the part.

The multidimensional data points can include values in three spatial dimensions. The uncertainty ranges in three spatial dimensions can be used to define three-dimensional uncertainty zones surrounding the individual data points. The tolerance zones can also occupy three-dimensional regions of space. An amount of collective overlap between the uncertainty zones and the tolerance zones can be examined for approaching a best fit solution at which the uncertainty zones are entirely overlapped by the tolerance zones. The boundaries of the uncertainty zones can be compared to boundaries of the tolerance zones to maximize the spacing of the boundaries of the uncertainty zones from the boundaries of the tolerance zones.

Another version of the invention as a method of evaluating measured data points against geometrical tolerances associates the measured data points with uncertainty ranges. The geometrical tolerances are modified based on the uncertainty ranges of the measured data points to define local acceptance zones for the measured data points. The measured data points are collectively moved relative to the local acceptance zones. The locations of the measured data points are evaluated with respect to the local acceptance zones at different relative positions between the measured data points and the local acceptance zones toward a solution in which the measured data points collectively fit within the local acceptance zones.

The uncertainty ranges can be based on measurement uncertainties related to a desired level of confidence for determining a geometric range within which the measured data points can be expected to occupy to the desired level of confidence. In addition, the uncertainty ranges can vary among the measured data points. The measured data points can be relatively translated and rotated with respect to the local acceptance zones of the measured data points. A best-fit algorithm can be performed to find a solution in which the measured data points fit within the local acceptance zones. In particular, the best-fit algorithm can be performed to find a solution in which deviations of the measured data points from the local acceptance zones are minimized.

Another version of the invention as a method of fitting measured data points within a geometrical tolerance zone having regard for uncertainty ranges of the measured data points includes comparing the measured data points to the geometrical tolerance zone to assess how well the measured data points fit within the geometrical tolerance zone. Incorporated into the assessment of how well the measured data points fit within the geometrical tolerance zone are the uncertainty ranges of the measured data points. The measured data points are collectively relatively transformed in accordance with available freedoms for orienting the measured data points with respect to the geometrical tolerance zone. The assessment of how well the measured data points fit within the geometrical tolerance zone is repeated toward a solution at which the measured data points best fit within the geometrical tolerance zone having regard for the uncertainty ranges of the measured data points.

Yet another version of the invention involves a method of determining whether measured data points of a part represent an actual description of the test part that fits within a tolerance zone to a desired level of confidence. Each of the measured data points is associated with a geometric uncertainty range based on a statistical expression of expected variation of the measured data points and bounded by a desired level of confidence. The measured data points are fitted within a geometric tolerance zone having regard for different geometric uncertainty ranges associated with the measured data points by collectively fitting the measured data points within the geometric tolerance zone by amounts corresponding to the different geometric uncertainty ranges of the measured data points.

Preferably, the measured data points are collectively transposed with respect to the geometric tolerance zone and errors are calculated at which any of the measured data points do not fit within the geometric tolerance zone by the amounts that correspond to the different geometric uncertainty ranges of the measured data points. The measured data points are preferably multidimensional data points having spatial locations within a measurement frame of reference. The geometric tolerance zone occupies a region of space within an ideal frame of reference. The measurement frame of reference is relatively moved with respect to the ideal frame of reference to identify a relative orientation between the frames of reference within which the measured data points fit within the geometric tolerance zone by amounts corresponding to the different geometric uncertainty ranges of the measured data points. The relative motion preferably includes both relative translation and relative rotation between the frames.

BRIEF DESCRIPTION OF THE SEVERAL
VIEWS OF THE DRAWINGS

DETAILED DESCRIPTION OF THE INVENTION

Figure 1A:
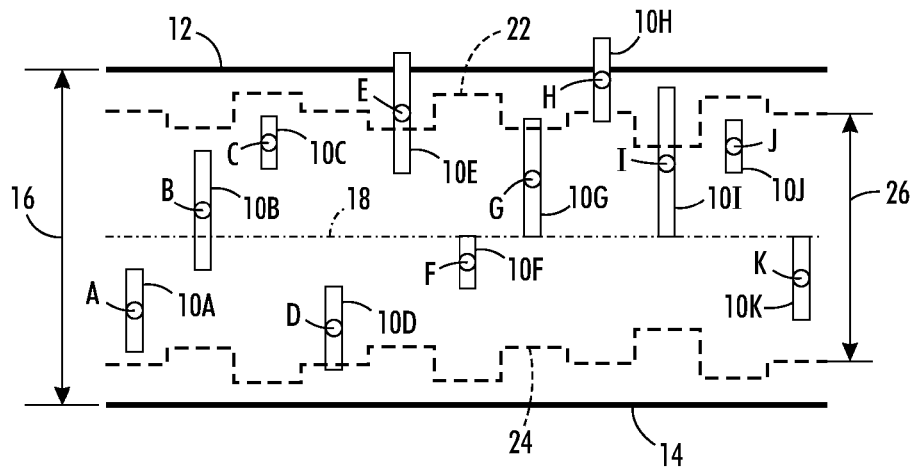
FIG. 1A is a diagram showing one-dimensional data from a test part with different size uncertainty ranges superimposed on a tolerance zone for accepting or rejecting the part.
Figure 1B:
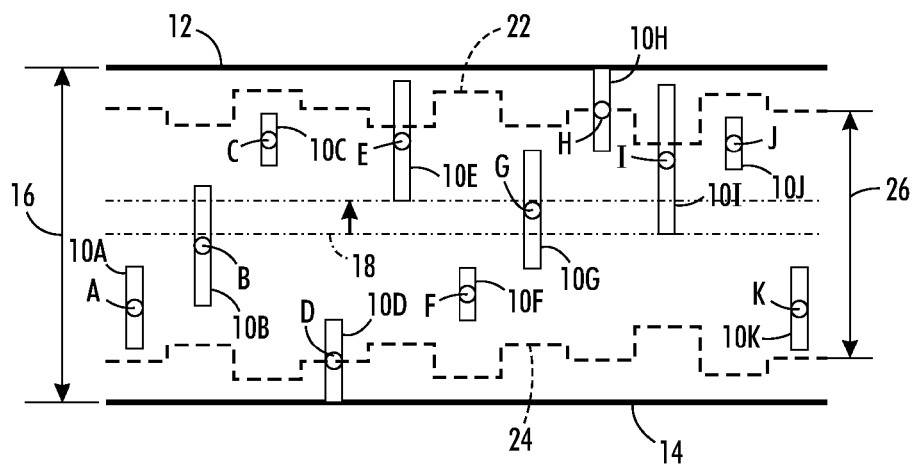
FIG. 1B is a similar diagram showing the one-dimensional data relatively translated with respect to the tolerance zone to fit the one-dimensional data together with its different size uncertainty ranges within the upper and lower boundaries of the tolerance zone.

Although the invention is mainly directed to the measurement of points in space having more than one spatial dimension, the invention can be at least partly understood in the context of one-dimensional measurements, such as the set of measured points A-K depicted in the diagrams of FIGS. 1A and 1B. The measured points A-K have measured values represented by relative vertical displacements but are spaced apart in a horizontal direction for purposes of distinguishing rather than locating the points.

The illustrated bars 10A-10K associated with each of the measured points represent ranges of uncertainty regarding the true values of the measured points. Assuming Gaussian distributions of possible values, the upper and lower boundaries of the ranges correspond to a chosen confidence interval. For example, a confidence interval of 95 percent covers a range of values within two standard deviations of the measured value.

Also shown in FIGS. 1A and 1B are the upper and lower boundaries 12 and 14 of a tolerance zone 16 that express a range of values greater than and less than a nominal value 18. For the test part measured by the points A-K to be accepted, all of the measured points A-K must lie between the upper and lower boundaries 12 and 14 of the tolerance zone 16. Preferred metrology practices also take into account the uncertainties of the measurements A-K and, in accordance with the purposes of this invention, impose an additional requirement for accepting the test part, namely, that the uncertainty ranges 10A-10K associated with each of the measured points A-K also lie within the tolerance zone 16. The additional requirement defines a narrower acceptance zone 26 between upper and lower boundaries 22 and 24 that are offset from the upper and lower boundaries 12 and 14 of the tolerance zone 16 by one half of the uncertainty ranges 10A-10K. Any of the measured points A-K lying between the upper and lower boundaries 22 and 24 of the contracted acceptance zone 26 can be estimated to lie within the tolerance zone 16 to the level of confidence associated with the uncertainty ranges 10A-10K. Thus, the acceptance zone 26 provides a convenient way of assessing whether the measured points A-K are within tolerance to the desired degree of confidence.

Although all of the measured points A-K plotted in FIG. 1A lie within the tolerance zone 16, two of the points, E and H, lie beyond the acceptance zone 26. Accordingly, the uncertainty ranges 10E and 10H of the measured points E and H extend outside the tolerance zone 16. Taking into account the additional requirement for accommodating measurement uncertainty, the test part as measured cannot be accepted.

In keeping with the purposes of the invention, the measured points A-K are understood to be referenced with respect to one another but do not have absolute values. Instead, the datum from which all of the points A-K are measured is, itself, arbitrary. Similarly, the upper and lower boundaries 12 and 14 of the tolerance zone 16 define a limited range of variation (such as roughness), but the datum from which the range of variation is measured remains arbitrary. Accordingly, for comparing the measured points A-K to the boundaries 12 and 14 of the tolerance zone 16 or more precisely to the boundaries 22 and 24 of the acceptance zone 26, the measured points A-K can be collectively translated along their measured dimension with respect to the tolerance and acceptance zones 16 and 26 to find a best fit within those zones.

FIG. 1B depicts such a best-fit solution for the measured points A-K of FIG. 1A, where all of the measured points A-K together with their respective uncertainty ranges 10A-10K fit within the tolerance zone 16. In doing so, all of the measured points A-K can be seen to lie within the acceptance zone 26. Thus, after allowing for the relative translation of the measured points A-K through the distance $T_y$ with respect to the nominal value 18 of the tolerance zone 16, the test part can be accepted.

The proposed best-fit solution is not the best collective fit of the measured points A-K to the nominal value 18 of the tolerance zone 16. Instead, the proposed best-fit solution actively takes into account the uncertainty ranges 10A-10K of the measured points and exploits the one-degree of freedom provided by relative translation to fit the uncertainty ranges 10A-10K of the measured points A-K as best as possible within the tolerance zone 16.

Although the principles of the invention find root in one-dimensional data, the invention is believed most useful as a process for treating multi-dimensional data. Such measured points have values in at least two dimensions. In the plural dimensions, geometric tolerance zones generally straddle the dimensions of an ideal or nominal part definition, also referred to as a nominal model boundary, for a given orientation of a part. However, the orientation at which an actual part is measured is generally not known beyond how well the measured points fit within the tolerance zones. For measured points having values in two dimensions, up to three degrees of freedom are available for collectively fitting the measured points to the tolerance zones—two orthogonal axes of translation and one axis of rotation normal to the axes of translation. For measured points having values in three dimensions, up to six degrees of freedom are available for collectively fitting the measured points to the tolerance zones—three orthogonal axes of translation and three corresponding orthogonal axes of rotation.

The tolerance zones for two-dimensional data points generally circumscribe areas, and the tolerance zones for three-dimensional data points generally circumscribe volumes. The size of the tolerance zones can vary between dimensions, features, or locations on the test parts. In accordance with the further purposes of the invention, the uncertainty ranges for multi-dimensional data also occupy multi-dimensional space. The uncertainty ranges along the measurement dimensions for multidimensional points can be defined as regions of space having closed forms. For example, two-dimensional data having equal uncertainty ranges in the two dimensions can be defined as regions of space within a circular boundary. Three-dimensional data having equal uncertainty ranges in the three dimensions can be defined as regions of space within a spherical boundary. Unequal uncertainty ranges in different dimensions can define other shaped regions of space including oblong shapes in two dimensions and football (e.g., various squashed football) shapes in three dimensions.

Figure 2A:
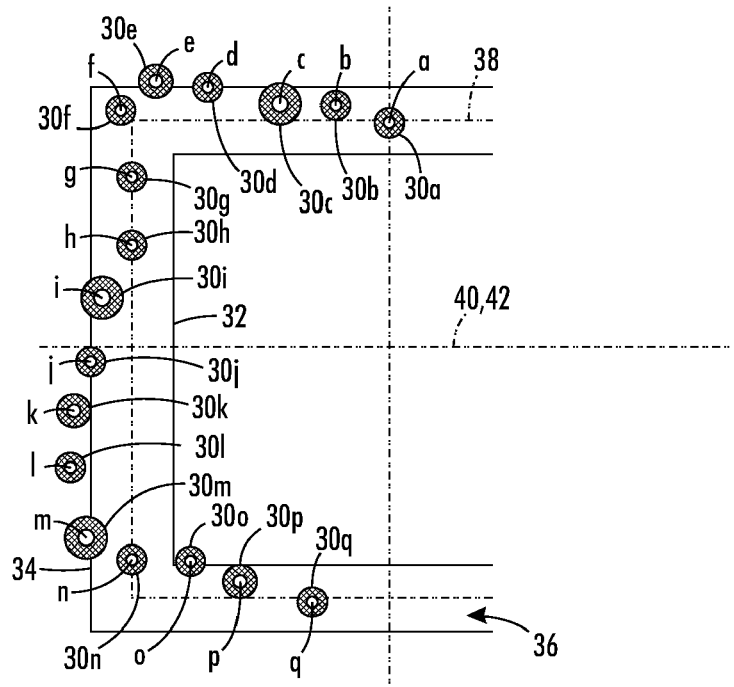
FIG. 2A is a diagram showing two-dimensional data from a test part with different size uncertainty zones superimposed on a tolerance zone defining an area for accepting or rejecting the part.
Figure 2B:
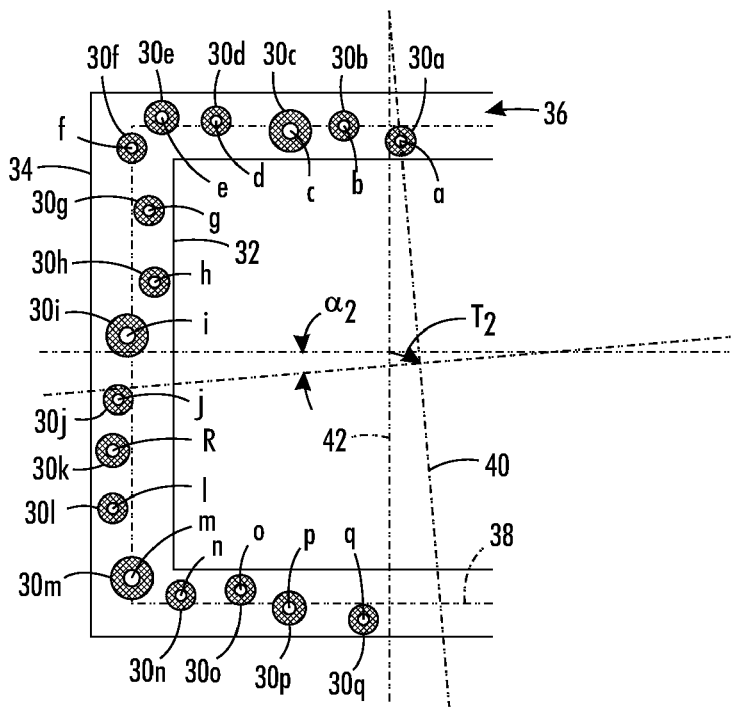
FIG. 2B is a similar diagram showing the two-dimensional data relatively translated and rotated with respect to the tolerance zone to fit the two-dimensional data together with its different size uncertainty ranges within the inner and outer boundaries of the tolerance zone.

FIGS. 2A and 2B show a set of two-dimensional measured data points a-q surrounded by different size circular regions representing different size uncertainty zones $30a$-$30q$ for the two-dimensional data points a-q. A geometric tolerance zone 36 having inner and outer boundaries 32 and 34 straddling an ideal part definition (nominal model boundary) 38 is arbitrarily superimposed on the set of measured data points a-q to evaluate whether the measured points a-q are within the desired tolerances. The spacing between the inner and outer boundaries 32 and 34 varies between horizontal and vertical directions, representing tolerances that differ in different dimensions. The shape and size of the geometric tolerance zone 36 varies according to the various tolerances set for the test parts.

All of the measured points a-q are referenced with respect to each other through a common measurement reference frame 40, which in FIG. 2A is depicted coincident with an ideal reference frame 42 for the ideal (nominal) part definition 38 and its associated tolerance zone 36. Since the measurement data is two dimensional, both the measurement reference frame 40 and the ideal reference frame 42 are limited to a common plane (the plane of FIGS. 2A and 2B), but the two frames 40 and 42 can be arbitrarily oriented with respect to each other throughout the common plane.

As seen in FIG. 2A, several of the uncertainty zones $30d$, $30e$, $30i$-$30m$, and $30o$ lie at least partially outside the tolerance zone 36. However, the measurement reference frame 40 can be both translated and rotated with respect to the ideal reference frame 42 throughout their common plane in search of an orientation at which all of the uncertainty zones $30a$-$30q$ lie within the tolerance zone 36. For example, a best-fitting algorithm can be arranged to collectively translate and rotate the measured points a-q together with their uncertainty zones $30a$-$30q$ to find a best solution for fitting all of the uncertainty zones $30a$-$30q$ within the tolerance zone 36. FIG. 2B shows such a solution, where the measurement reference frame 40 has been translated through a distance $T_2$ and rotated through angle $\alpha_2$ with respect to the ideal frame of reference 42 to achieve the desired solution.

To the extent that the uncertainty zones $30a$-$30q$ are circular, albeit of differing size, the required spacing between the measured points a-q and the tolerance zone boundaries 32 and 34 can be measured along lines of closest approach extending from the measured points a-q to the tolerance boundaries 32 or 34. A different minimum spacing from the tolerance zone boundaries 32 and 34 can be required for each of the measured points a-q according to the respective sizes of the uncertainty zones $30a$-$30q$, which in doing so defines an instant acceptance zone for the measured points a-q.

Figure 3:
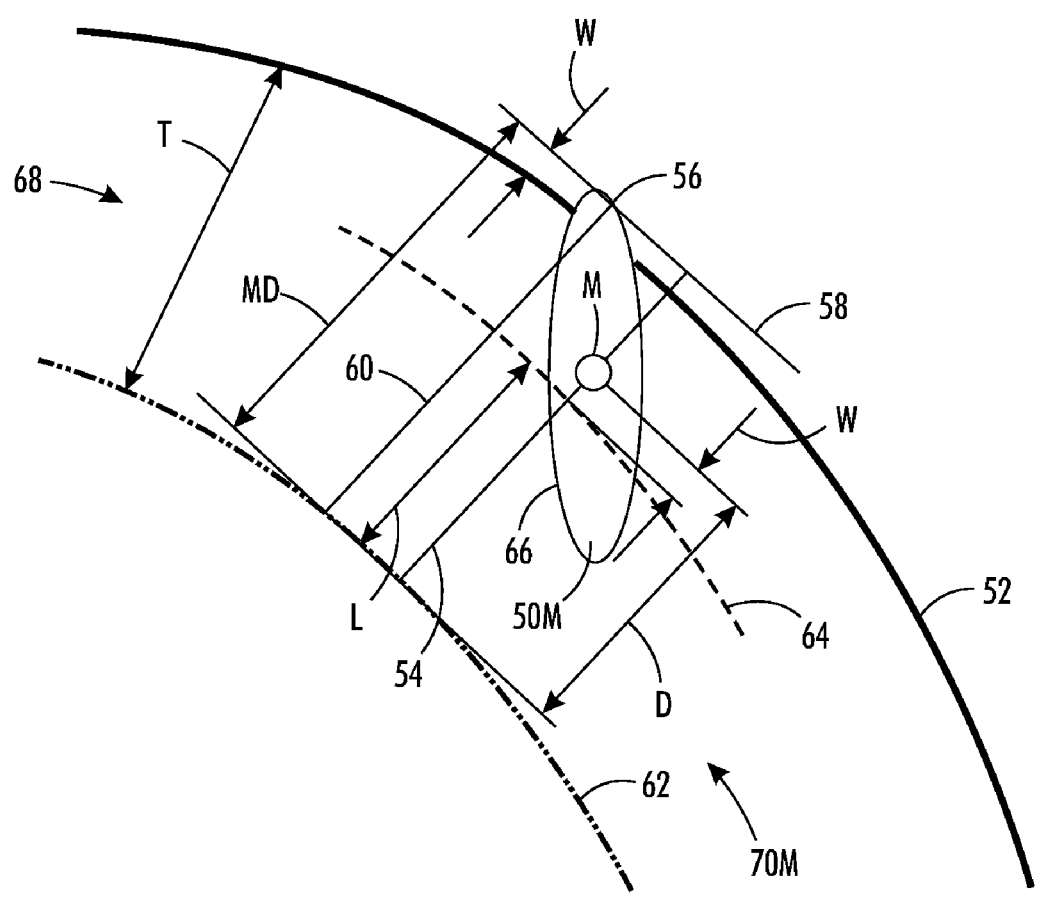
FIG. 3 depicts a measured data point having an oblong uncertainty zone that overlaps a tolerance zone boundary and references geometric constructs for defining a local acceptance zone.
Figure 4:
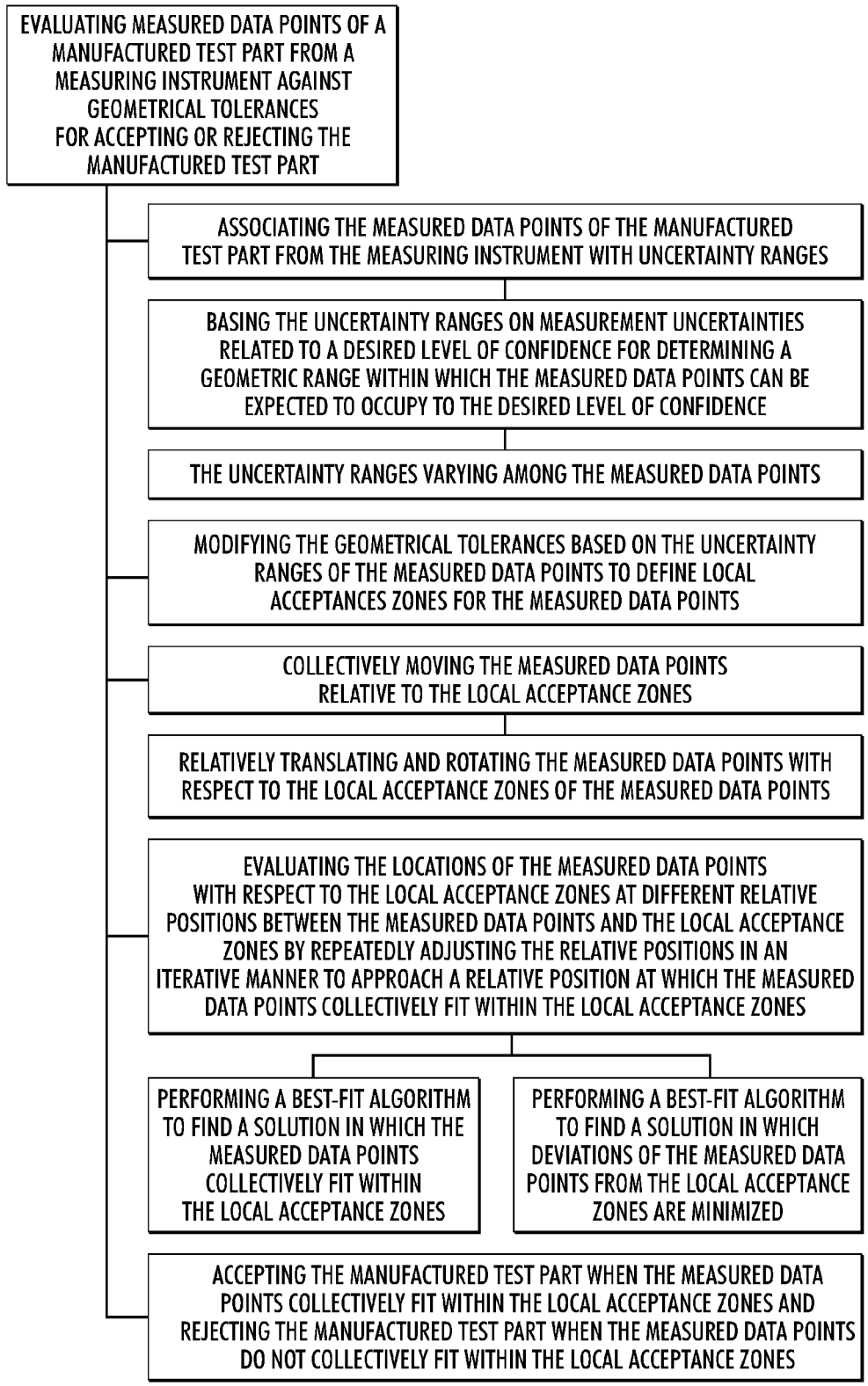
FIG. 4 is a flow chart depicting a method of evaluating measured data points of a manufactured test part from a measuring instrument against geometrical tolerances for accepting or rejecting the manufactured test part.
Figure 5:
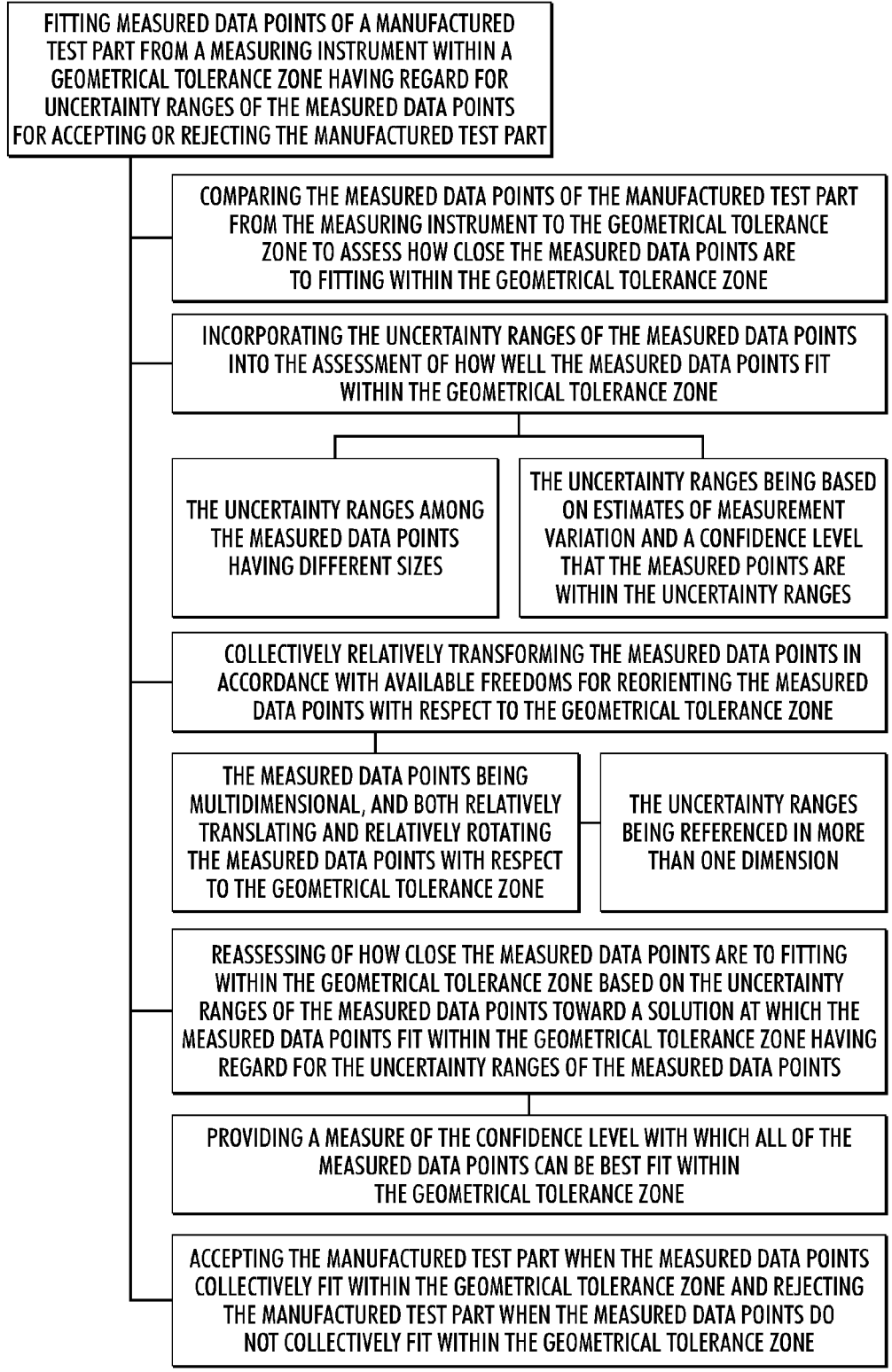
FIG. 5 is a flow chart depicting a method of fitting measured data points of a manufactured test part from a measuring instrument within a geometrical tolerance zone having regard for uncertainty ranges of the measured data points for accepting or rejecting the manufactured test part.
Figure 6:
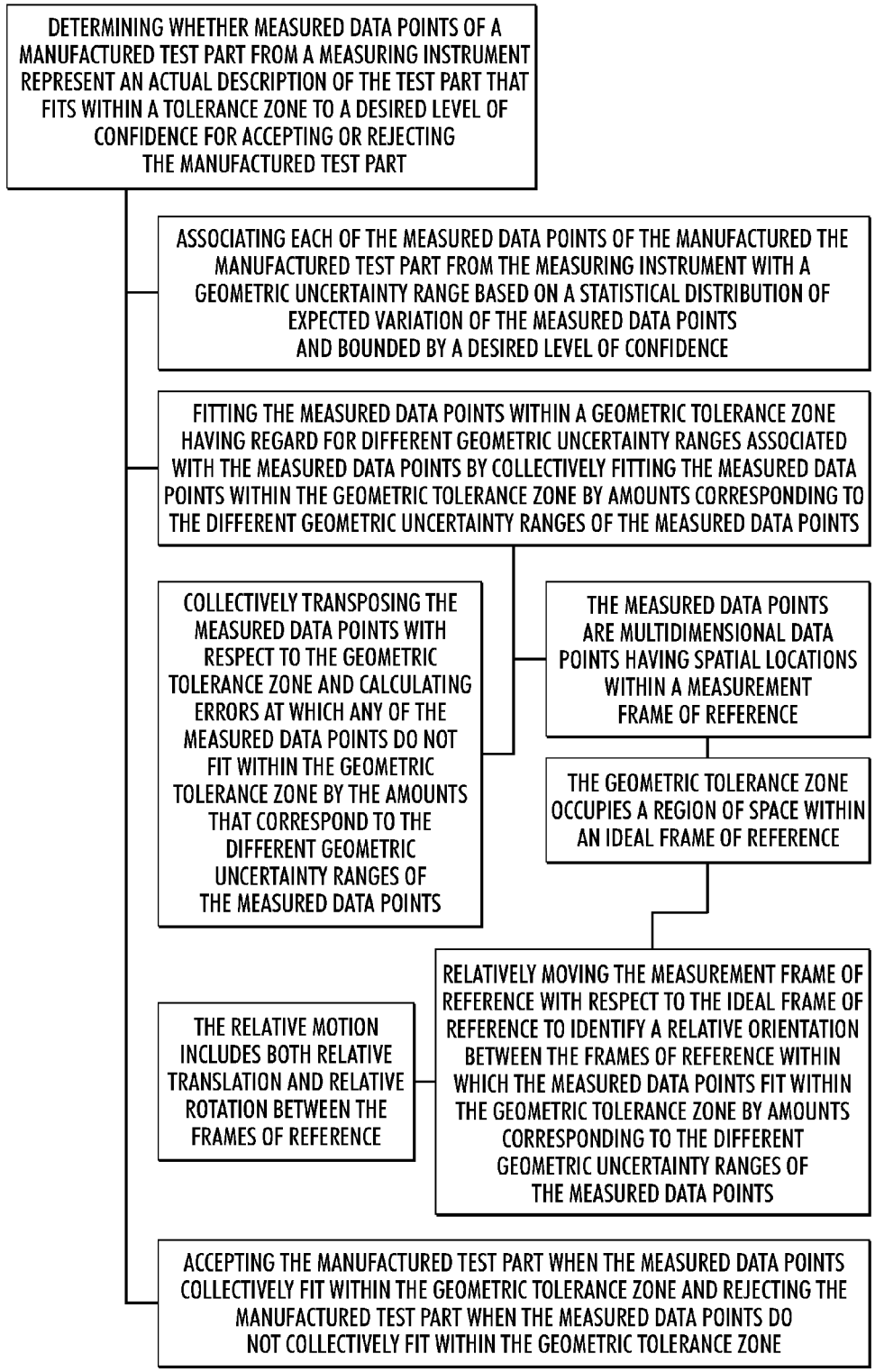
FIG. 6 is a flow chart depicting a method of determining whether measured data points of a manufactured test part from a measuring instrument represent an actual description of the test part capable of fitting within a tolerance zone to a desired level of confidence for accepting or rejecting the manufactured test part.

If the uncertainty zones depart significantly from circular or spherical, the closest approach of the uncertainty structure itself to a tolerance boundary may not be the same as the line of approach from the measured point to the tolerance zone boundary. For example, FIG. 3 shows a data point M having an oblong uncertainty zone 50M that extends outside a tolerance zone boundary 52 even though the uncertainty zone 50M remains within the tolerance zone boundary 52 along the closest approach of the measuring point M to the tolerance zone boundary 52.

A point 56 on a boundary 66 of the uncertainty zone 50M that is most out of tolerance is defined as a tangent point on the boundary 66 that is at the largest distance MD from a nominal model boundary 62 along a common normal between the nominal model boundary 62 and the uncertainty zone boundary 66. That is, the "worst" point 56 lies at the intersection of a tangent plane 58, which is tangent to the boundary 66 (e.g., perimeter or surface) of the uncertainty zone 50M along a normal line 60, which extends normal to both the nominal model boundary 62 and the uncertainty zone boundary 66. A distance "W" along the common normal line 60 between the tolerance zone boundary 52 and the "worst" point 56 is a measure of how far the "worst" point 56 lies out of tolerance beyond the tolerance zone boundary 52. By orthogonal projection onto a parallel line segment 54 through the measured point M, the distance "W" is also a measure of how far the measured point M lies outside of a local acceptance zone boundary 64 for the point M. Thus, the distance W defines the minimum distance required to translate the point M along the line segment 54 for moving both the uncertainty zone 50M within the tolerance zone boundary 52 and the measured point M within the acceptance zone boundary 64.

Uncertainty zones, such as the oblong uncertainty zone 50M, can have arbitrary forms in two or three dimensions depending on the number of dimensions of the measured points. The so-called "worst" point 56 of such uncertainty zones lies at the largest distance MD to the nominal model boundary 62 along the common normal 60 to both the uncertainty zone boundary 66 and the nominal model boundary 62. The uncertainty zone boundary 66 (i.e., surface in three dimensions), which contains the "worst" point 56, can be expressed in a parameter form as follows:

$$x=x(u,v) \tag{1.1}$$

$$y=y(u,v) \tag{1.2}$$

$$z=z(u,v) \tag{1.3}$$

Giving values for u and v in expressions (1.1), (1.2), and (1.3) generates all possible points in (x, y, z) on the uncertainty zone surface 66. The surface normal vector (X, Y, Z) in the point (x, y, z) on the uncertainty zone surface 66 can be derived from the expressions (1.1), (1.2), and (1.3) as follows:

$$X = \begin{bmatrix} \frac{\partial y}{\partial u} & \frac{\partial z}{\partial u} \\ \frac{\partial y}{\partial v} & \frac{\partial z}{\partial v} \end{bmatrix} \tag{2.1}$$

$$Y = \begin{bmatrix} \frac{\partial z}{\partial u} & \frac{\partial x}{\partial u} \\ \frac{\partial z}{\partial v} & \frac{\partial x}{\partial v} \end{bmatrix} \tag{2.2}$$

$$Z = \begin{bmatrix} \frac{\partial x}{\partial u} & \frac{\partial y}{\partial u} \\ \frac{\partial x}{\partial v} & \frac{\partial y}{\partial v} \end{bmatrix} \tag{2.3}$$

In the equations (2.1), (2.2), and (2.3), the partial derivatives calculate the surface normal vector (X, Y, Z) in the point (x, y, z) for the (u, v) parameter pairings. Since the point (x, y, z) of interest also lies along the common normal 60 to both the uncertainty zone boundary 66 and the nominal model boundary 62, the surface normal vector (X, Y, Z) at the "worst" point 56 in (x, y, z) extends parallel to a given normal vector R having coordinates (p, q, r) in the direction of the common normal 60, and the following equations apply:

$$X = p \quad (3.7)$$

$$Y = q \quad (3.2)$$

$$Z = r \quad (3.3)$$

Using equations (2.1)-(2.3) and (3.1)-(3.3), all of the (u, v) pairs satisfying the above conditions can be obtained. Substituting the (u, v) roots into equations (1.1), (1.2), and (1.3), the coordinates of the tangent points are obtained. Among the possible solutions, the "worst" point 56 in (x, y, z) lies at the largest distance MD from the nominal model boundary 62.

A best-fit algorithm for practicing the invention attempts to collectively fit the uncertainty zones (e.g., 50M) of the measured points (e.g., M) within a tolerance zone 68, which also corresponds to collectively fitting the measured data points (e.g., M) within their local acceptance zones (e.g., 70M).

Conventional best fitting algorithms performed without taking into account uncertainties of measurement provide generally for minimizing an error function:

$$F(Di, T),$$

where:
Di is the distance D of the $i^{th}$ measured point from the nominal model boundary 62, and
T is the distance of the relevant tolerance zone boundary (e.g., 52) from the nominal model boundary 62.

Taking into account uncertainties of measurement modifies the above function as follows:

$$F(MDi, T),$$

where:
MDi is the modified distance MD for the $i^{th}$ measured point from the nominal model boundary 62, and
T remains the distance of the relevant tolerance zone boundary (e.g., 52) from the nominal model boundary 62.

The best-fit algorithm itself does not require modification in accordance with the invention. However, the data entered for achieving a fit within the tolerance zone boundary 68 is changed. Instead of entering a distance D of the measured points (e.g., M) from the nominal model boundary (e.g., 62), the distance MD of the so-called "worst" points (e.g., 56) on the uncertainty zone boundaries (e.g., 66) are entered. The new goal is to fit the all of the uncertainty zones (e.g., 50M) of the measured points (e.g., M) entirely within the tolerance zone 68. The same calculations are performed regardless of whether a measured point (e.g. M) lies inside or outside the tolerance zone 68.

The best-fit algorithms compare how well the entire collection of measured data points (e.g. M) together with their uncertainty zones (e.g., 50M) fit within the tolerance zone 68 through a succession of relative positions (i.e., relative translation and rotation) between the measured points (e.g., M) and the tolerance zone 68. A different MDi distance value can be calculated for every measured point (e.g., M) through each of the relative positions at which the measured points (e.g., M) are reoriented with respect to the tolerance zone 68. The solution identifies the relative position at which the uncertainty zones (e.g., 50M) best fit within the tolerance zone 68 given the available freedoms for relative movement. The measured part (not shown) can be accepted if the MDi distance values of all of the measured points (e.g., M) are within the distance defined between the tolerance zone boundaries (e.g., 52).

Equivalently, the best-fit algorithm can be arranged for accepting data that compares the locations of measured points (e.g., M) to their local acceptance zones (e.g., 70M) as follows:

$$F(Di, Li),$$

where:
Di remains the distance D of the $i^{th}$ measured point from the nominal model boundary 62.
Li is the distance of the relevant local acceptance zone boundary (e.g., 64) of the $i^{th}$ measured point from the nominal model boundary 62.

Distances Li of the local acceptance zone boundaries (e.g., 64) from the nominal model boundary 62 are computed for each measured point (e.g., M) at each relative position of the measured point (e.g., M) with respect to the tolerance zone 68. The new goal is to fit all of the measured points (e.g., M) within their local acceptance zones (e.g. 70M), which are defined on a point-by-point basis to account for the size, shape, and orientation of the uncertainty zones (e.g., 50M).

The best fit algorithms compare how well the entire collection of measured data points (e.g., M) fit within their local acceptance zones (e.g. 70M) through a succession of relative positions (i.e., relative translation and rotation) between the measured points (e.g., M) and the tolerance zone 68. Different local acceptance zone boundaries (e.g., 64) can be calculated for every measured point (e.g., M) through each of the relative positions at which the measured points (e.g., M) are reoriented with respect to the tolerance zone 68. The solution identifies the relative position at which the measured points (e.g., M) best fit within their local acceptance zones (e.g., 70M) given the available freedoms for relative movement. The part can be accepted if all of the measured points (e.g., M) fit within their local acceptance zones (e.g., 70M).

Once the tolerance criteria have been met, the optimization can be stopped. However, it is also possible to find solutions that fit the measured points (e.g., M) in positions further recessed from their local acceptance zone boundaries (e.g., 64) or that fit the "worst" points (e.g., 56) in positions further recessed from the tolerance zone boundaries (e.g., 52). In doing so, it would be possible to determine a higher overall confidence value that all of the measured points are actually within tolerance. The confidence intervals can also be set differently for different measured points and the optimization routine rerun to find a new solution that satisfies the revised criteria. The further analysis can be used to monitor manufacturing trends and to respond proactively.

Similarly, parts with measured points that do not fit within their local acceptance zones or with "worst" point displacements outside the tolerance zone can be further evaluated to determine at what reduced level of confidence the part might be accepted. Further judgments can be made based upon such additional factors as the number and location of the measured points that exceed their local tolerances zones for accepting or not accepting such parts. The information can also be used to define corrective actions for bringing the parts further into tolerance.

Additional freedoms for fitting measured data points within acceptance zones accompany additional dimensions of the measured data points. Both the uncertainty zones and the tolerance zones for three-dimensional data points occupy spatial volumes, and the measured points together with their three-dimensional uncertainty zones can be relatively translated in three orthogonal directions and relatively rotated about axes in orthogonal directions to find their best fit within the spatial volume of the tolerance zone.

Although the invention has been described with respect to a limited number of embodiments, those of skill in the art will appreciate that many other embodiments and variations are possible within the spirit and scope of the invention.

The invention claimed is:

1. A method of evaluating measured data points of a manufactured test part from a measuring instrument against geometrical tolerances for accepting or rejecting the manufactured test part comprising the steps of:

associating the measured data points of the manufactured test part from the measuring instrument with uncertainty ranges, modifying the geometrical tolerances based on the uncertainty ranges of the measured data points to define local acceptances zones for the measured data points, collectively moving the measured data points relative to the local acceptance zones, evaluating the locations of the measured data points with respect to the local acceptance zones at different relative positions between the measured data points and the local acceptance zones by repeatedly adjusting the relative positions in an iterative manner to approach a relative position at which the measured data points collectively fit within the local acceptance zones, and accepting the manufactured test part when the measured data points collectively fit within the local acceptance zones and rejecting the manufactured test part when the measured data points do not collectively fit within the local acceptance zones.

2. The method of claim 1 in which the uncertainty ranges are based on measurement uncertainties related to a desired level of confidence for determining a geometric range within which the measured data points can be expected to occupy to the desired level of confidence.

3. The method of claim 2 in which the uncertainty ranges vary among the measured data points.

4. The method of claim 1 in which the step of collectively moving includes relatively translating and rotating the measured data points with respect to the local acceptance zones of the measured data points.

5. The method of claim 1 in which the step of evaluating includes performing a best-fit algorithm to find a solution in which the measured data points collectively fit within the local acceptance zones.

6. The method of claim 1 in which the step of evaluating includes performing a best-fit algorithm to find a solution in which deviations of the measured data points from the local acceptance zones are minimized.

7. A method of fitting measured data points of a manufactured test part from a measuring instrument within a geometrical tolerance zone having regard for uncertainty ranges of the measured data points for accepting or rejecting the manufactured test part comprising the steps of:

comparing the measured data points of the manufactured test part from the measuring instrument to the geometrical tolerance zone to assess how close the measured data points are to fitting within the geometrical tolerance zone, incorporating the uncertainty ranges of the measured data points into the assessment of how well the measured data points fit within the geometrical tolerance zone, collectively relatively transforming the measured data points in accordance with available freedoms for reorienting the measured data points with respect to the geometrical tolerance zone, reassessing of how close the measured data points are to fitting within the geometrical tolerance zone based on the uncertainty ranges of the measured data points toward a solution at which the measured data points fit within the geometrical tolerance zone having regard for the uncertainty ranges of the measured data points, and accepting the manufactured test part when the measured data points collectively fit within the geometrical tolerance zone and rejecting the manufactured test part when the measured data points do not collectively fit within the geometrical tolerance zone.

8. The method of claim 7 in which the measured data points are multidimensional, and the step of collectively relatively transforming includes both relatively translating and relatively rotating the measured data points with respect to the geometrical tolerance zone.

9. The method of claim 8 in which the uncertainty ranges are referenced in more than one dimension.

10. The method of claim 7 in which the uncertainty ranges among the measured data points have different sizes.

11. The method of claim 7 in which the uncertainty ranges are based on estimates of measurement variation and a confidence level that the measured points are within the uncertainty ranges.

12. The method of claim 7 in which the step of reassessing provides a measure of the confidence level with which all of the measured data points can be best fit within the geometrical tolerance zone 13. A method of determining whether measured data points of a manufactured test part from a measuring instrument represent an actual description of the test part that fits within a tolerance zone to a desired level of confidence for accepting or rejecting the manufactured test part comprising the steps of:

associating each of the measured data points of the manufactured the manufactured test part from the measuring instrument with a geometric uncertainty range based on a statistical distribution of expected variation of the measured data points and bounded by a desired level of confidence, fitting the measured data points within a geometric tolerance zone having regard for different geometric uncertainty ranges associated with the measured data points by collectively fitting the measured data points within the geometric tolerance zone by amounts corresponding to the different geometric uncertainty ranges of the measured data points, and accepting the manufactured test part when the measured data points collectively fit within the geometric tolerance zone and rejecting the manufactured test part when the measured data points do not collectively fit within the geometric tolerance zone.

14. The method of claim 13 in which the step of fitting includes collectively transposing the measured data points with respect to the geometric tolerance zone and calculating errors at which any of the measured data points do not fit within the geometric tolerance zone by the amounts that correspond to the different geometric uncertainty ranges of the measured data points.

15. The method of claim 13 in which the measured data points are multidimensional data points having spatial locations within a measurement frame of reference.

16. The method of claim 15 in which the geometric tolerance zone occupies a region of space within an ideal frame of reference.

17. The method of claim 16 in which the step of fitting includes relatively moving the measurement frame of reference with respect to the ideal frame of reference to identify a relative orientation between the frames of reference within which the measured data points fit within the geometric tolerance zone by amounts corresponding to the different geometric uncertainty ranges of the measured data points.

18. The method of claim 17 in which the relative motion includes both relative translation and relative rotation between the frames of reference.

* * * * *